Figure 1:
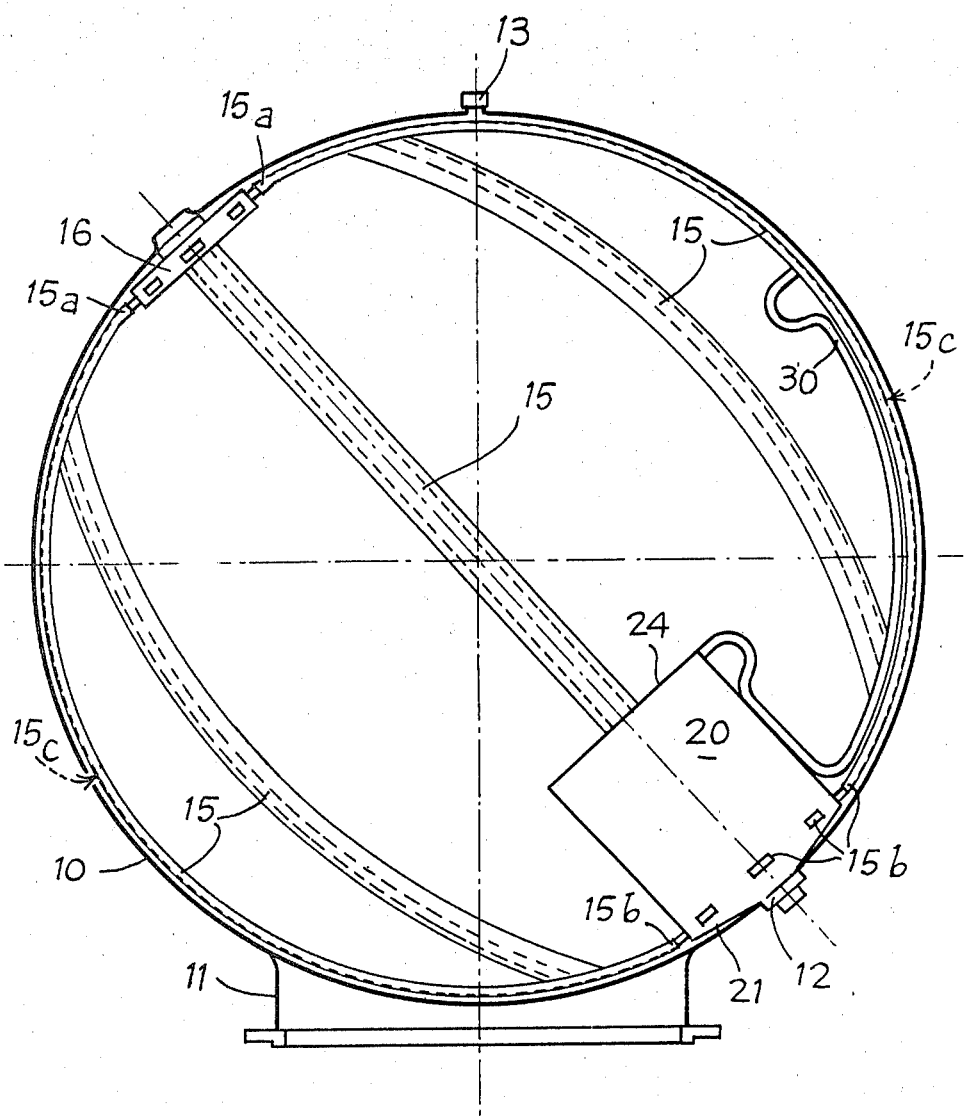

United States Patent [19]

Robert

[11] 4,399,831

[45] Aug. 23, 1983

[54] SURFACE TENSION STORAGE TANK

[75] Inventor: Michel Robert, Montigny Le Bretonneux Trappes, France

[73] Assignee: Societe Europeenne De Propulsion, Puteaux, France

[21] Appl. No.: 272,308

[22] Filed: Jun. 10, 1981

[30] Foreign Application Priority Data

Jun. 20, 1980 [FR] France .................. 80 13811

[51] Int. Cl.³ .................................... B64G 1/00
[52] U.S. Cl. ............................ 137/154; 137/590
[58] Field of Search ............... 137/177, 590, 154, 206

[56] References Cited

U.S. PATENT DOCUMENTS 3,202,160 8/1965 Barger ............................ 137/590 X
3,486,302 12/1969 Paynter .
4,168,718 9/1979 Frosch ............................... 137/177

FOREIGN PATENT DOCUMENTS 1444982 5/1966 France .
2254494 7/1975 France .
2372642 6/1978 France .

OTHER PUBLICATIONS

*Journal of Spacecraft and Rockets;* vol. 8, No. 2; Feb. 1971, "A Survey of Current Developments in Surface Tension Devices for Propellant Aquisition"; Brock, et al.

Primary Examiner—Alan Cohan
Attorney, Agent, or Firm—Weingarten, Schurgin, Gagnebin & Hayes

[57] ABSTRACT

The invention relates to a surface tension storage tank comprising a liquid outlet from where the liquid can be expelled under the action of a pressurant gas. A collector device issues into a chamber of a tubular device which also comprises a draining conduit opening at one end at the bottom of said chamber, the other end being situated higher than the first when the tank is being filled. On the side opposite its bottom, the chamber is situated close to the liquid-expelling orifice from which it is separated by an outlet gas barrier. Gas barriers are also provided at the other end of the conduit and on the level of the junction of the collector device with the said chamber.

7 Claims, 2 Drawing Figures

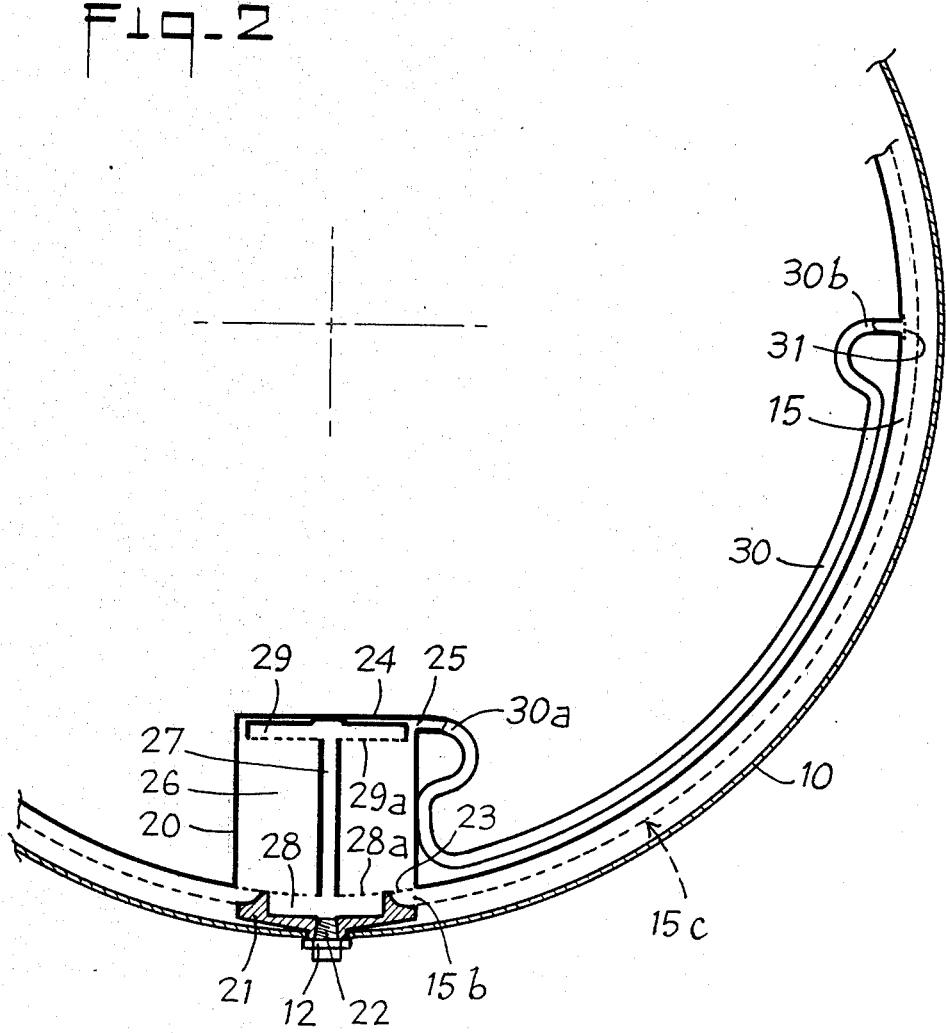

SURFACE TENSION STORAGE TANK

The present invention relates to a surface tension storage tank of the type comprising an enclosure, a liquid outlet provided in a wall of the enclosure and through which the liquid contained in the storage tank can be expelled under the action of a pressurant gas, a liquid collecting device extending into the enclosure and reaching a chamber situated close to the said outlet and communicating therewith via at least an outlet gas barrier.

Such a pressurized storage tank is more particularly designed for use on board satellites or three-axis stabilized platforms for storing liquid propellants, and whenever necessary supplying engines used for example for satellite attitude and orbit controlling operations.

With three-axis stabilized satellites, there is no favored direction for the ambient acceleration. Therefore, the propellant can be placed in any part of the storage tank as long as it remains in contact with the wall. A first problem arising then is to establish in every case a liquid continuity between the tank wall and its outlet. Several solutions have already been proposed, and, in particular, devices using the capillary phenomena, which devices are designated here under the term of liquid collecting devices.

A special liquid collecting device which is known consists of a plurality of channels arranged along the internal surface of the storage tank and at a small distance off said surface, and of which at least the wall facing said surface is made of a porous material such as a screening. Said channels bring the liquid towards the outlet and the screenings allow the flow of liquid whilst opposing the passage of the pressurant gas due to their gas barrier property. Indeed, when a screening is wetted and as long as the difference in the pressures being applied on either side of the screening does not exceed the pressure difference threshold value at which the liquid-gas interface meniscuses created between the pores of the screening are disrupted, said screening opposes the passage of gas bubbles inside the channels. If such bubbles were expelled from the storage tank, they would perturb the functioning of the devices using the liquid stored in the tank.

The functioning of the gas barriers raises no problem when the satellite is in orbit. Indeed, the ambient acceleration is normally nil or nearly nil and the use of the engines during attitude and orbit control phases only entails relatively low amplitude accelerations and this for limited periods. The pores of the gas barrier can therefore be easily dimensioned, in view of the surface tension of the liquid stored, so that the pressure difference threshold value remains much greater than the differential pressure which is applied on the gas barrier due to the said limited accelerations.

It is not so during the satellite launching phase and during the phase of transfer into orbit with spin stabilizing. Indeed, some gas can penetrate into the channels and be confined therein when, the satellite being orbitting, the porous walls of the channels have resumed their function of gas barrier. The gas is brought gradually towards the outlet and risks to be expelled therethrough before most of the stored liquid has been used. It has, it is true, been proposed to provide the outlet of the storage tank with a gas barrier, but there might be a design wherein said barrier is entirely covered by gas which has penetrated into the collecting channels, and this before the stored liquid has been used.

It is therefore a first object of the invention to propose a storage tank in which the gas which may have penetrated in the collecting device before the said tank started to empty will not risk to be expelled from the said tank as long as a substantial quantity of liquid is left in said tank.

Other problems relative to surface tension storage tanks for satellites are met when the tank is being filled. Indeed, the filling is normally carried out whilst the tank is mounted inside the satellite. It is important to fill the tank without leaving any gas pockets at least inside the collecting device and close to the outlet and this has to be done without moving the storage tank, with safety, and without lengthy and complicated operations being needed. Therefore, it is a further object of the invention to propose a storage tank complying with all these requirements.

These objects are reached with a storage tank of the type defined at the beginning of the description and, which further comprises according to the invention:
  a tubular device situated inside the enclosure, and provided with a first swollen part forming the chamber situated close to the outlet and whereinto reaches the collecting device, and a second part of smaller cross-section, forming a conduit issuing at a first end into a bottom area of the chamber opposite that situated on the outlet side and which has a second end situated at a level of the tank more remote from the outlet than its first end, and
  walls forming gas barriers to separate the collecting device from the chamber at their connecting point and to separate the second end of the conduit from the internal volume of the tank.

The walls separating the collecting device from the chamber of the tubular device prevent the gas which may have accidentally penetrated into the collecting device from reaching the chamber, initially full of liquid, before the storage tank starts emptying. As and when the liquid is drawn off from the storage tank during the mission of the satellite, said gas can penetrate into the chamber where it is confined due to the presence of the outlet gas barrier and as long as the latter is wetted. The expulsion of the gas from the storage tank is thus delayed to a maximum.

Preferably, the collecting device is composed of a plurality of channels which extend along the internal surface of the enclosure and at a relatively small distance therefrom, and of which at least the wall facing the said internal surface is porous and the free volume of the chamber of the tubular device is at least equal to the volume occupied after draining by a quantity of gas whose volume would have been equal to that of the channels before the draining started. Thus, the functioning of the storage tank is not affected even in the extreme case in which all the channels may be full of gas when the mission of the satellite begins.

The tubular conduit which opens at the bottom of the chamber constitutes a draining conduit permitting to fill up the storage tank through its outlet and thus to ensure that after the filling up, the chamber will be full of liquid.

The second end of the draining conduit can reach inside the tank by being closed off by a wall forming gas barrier. When the collecting device is of the type with channels, the conduit of the tubular device is advantageously connected to one of the channels which constitutes then an extension of the draining conduit, the tubular device in this case keeping minimum dimensions.

A particular advantage of the storage tank according to the invention resides in the fact that the "dead mass" of the tank is reduced to a minimum. The dead mass comprises a first component which is constituted by the mass of the empty tank and a second component constituted by the mass of liquid remaining in the said tank when the first bubbles of pressurant gas are expelled from the tank. The first component is not really noticeably affected by the presence of the tubular device. The second component is reduced due to the fact that the gas is held back in the chamber as long as liquid is brought therein in sufficient quantity to wet the outlet gas barrier. Said secnd component can be further minimized by placing inside the chamber an extra collector device which communicates on the one hand with the outlet, and on the other hand, with the free volume of the chamber through the outlet gas barrier.

The invention will be more readily understood on reading the following description with reference to the accompanying drawings, in which:

FIG. 1 is a diagrammatical view of a meridian section of an embodiment of the storage tank according to the invention, and, FIG. 2 is a detailed view of a meridian section, and on a larger scale, of part of the tank illustrated in FIG. 1.

The storage tank illustrated in FIGS. 1 and 2 is for example designed to store propellants in a satellite. It is entirely constituted of metal elements.

Said storage tank comprises a spherical enclosure 10 welded to an annular support 11 for fixing the storage tank. In the wall of said tank are provided a liquid-expelling orifice 12 and an orifice 13 situated at the top of the storage tank when said latter is mounted on the ground. The orifice 13 constitutes the draining orifice at filling time and a pressurant gas inlet at draining time.

The liquid-expelling orifice 12 is placed close to the base 11 and is connected by way of pipes (not shown) to one or more engines.

A liquid-collecting device composed of channels 15 is placed insde the enclosure 10. Said channels are interconnected by means of a circular casing 16 to a first end 15a situated close to the area of the enclosure which faces that provided with the orifice 12. From their end 15a the channels 15 extend along the meridian planes up to their end 15b close to the liquid-expelling orifice 12. Said channels 15 are arranged along the inner wall of the enclosure 10 whilst being slightly apart therefrom. In the illustrated example, the channels are all identical, distributed regularly at an angle, and have a rectangular-shaped cross-section. The wall 15c of the channels 15 which faces the internal surface of the enclosure 10 is porous, for example formed by a screening or a grid-like sheet. The other walls of the channels are solid.

At their ends 15b, the channels 15 reach the cylindrical chamber 20 of a tubular device further comprising a conduit 30 connected to the chamber 20.

As clearly shown in FIG. 2, the chamber 20 is cylinder-shaped of the same axis as the liquid-expelling orifice. Said chamber 20 has an end wall 21 situated immediately close to that part of the internal surface of the enclosure which surrounds the orifice 12. A central opening 22 is provided in the wall 21 and is directly connected to the orifice 12. The bottom of the chamber 20 is closed by an end wall 24 which faces the wall 21.

The channels 15 are connected to the chamber 20 via openings made in the side wall of said chamber close to the end wall 21. The free inner volume 26 of the chamber 20 is separated from the inside of the channels 15 by gas barriers 23 constituted by screening or by grid-like sheets.

The conduit 30 reaches an end 30a in the chamber 20 through an opening 25 made in the bottom wall 24, or as in the illustrated example, immediately close thereto. At the other end 30b the conduit 30 is connected to an opening formed in a wall of one of the channels 15, said opening being provided with a gas barrier 31 similar to the barriers 23. The end 30b is situated at a higher level of the storage tank than the end 30a in the filling position illustrated in FIG. 1.

An axial tube 27 is placed inside the chamber 20 and opens at its ends into circular compartments 28, 29 situated close to the walls 21 and 24 of the chamber 20 and extending opposite the largest part of the internal surface of said walls. The compartment 28 communicates directly with the opening 22. The communication between the compartments 28, 29 and the internal volume 26 of the chamber 20 is done through the walls 28a, 29a facing the compartments 28, 29, said walls being porous and constituting the outlet gas barrier of the storage tank. In the illustrated example, the walls 28a and 29a are radial screenings joining the ends of the tube 27 to the periphery of the compartments 28, 29.

The introduction of pressurant gas into the enclosure is done through the orifice 13. To this effect, a pipe (not shown) connected to a source of gas under pressure can be connected up to the orifice 13 after the filling up of the tank. The pressurant gas can be definitely introduced into the storage tank when said latter is on the ground, or it can be permanently introduced from a reserve situated outside the enclosure.

The storage tank described hereinabove works as explained hereinafter.

The storage tank being mounted inside the satellite is in the position illustrated in FIG. 1, the liquid is introduced through the expelling orifice 12 whereas the draining orifice 13 is open. The liquid penetrates into the chamber 20, and from there, into the channels 15 and into the draining conduit 30. The air is expelled progressively and this filling method permits to prevent air pockets being confined in the chamber 20, the channels 15 and the conduit 30 due to the presence of gas barriers.

Once the desired quantity of liquid has been introduced, the storage tank is pressurized.

During the phases going from the launching until the stabilizing in orbit, the accelerations applied to the satellite are liable to cause the penetration of pressurant gas into the channels 15. However, said gas cannot penetrate into the tubular device full of liquid and protected by gas barriers. When the said satellite is stabilized in orbit, the walls 15c of the channels 15 resume their function of gas barriers. As a result, any gas which may have penetrated in the channels remains confined therein.

Throughout the mission of the satellite, the liquid is expelled from the storage tank every time this is necessary. The quantity of liquid contained in the reservoir reduces as well as the pressure of the pressurant gas. If some of the gas confined inside the channels 15 happens to cover entirely the gas barriers 23 which separate the channels 15 from the chamber 20, said gas can penetrate into the chamber. Thus, the confined gas can accumulate gradually in the internal volume 26 of the chamber 20 and remains there as long as sufficient liquid is left in the chamber to wet the outlet gas barrier. The most disadvantageous case which can be met is that in which the channels 15 are full of gas when the tank starts draining, at the maximum pressure of the pressurant gas. In order not to affect the operation of the storage tank until the draining is completed, the free volume of the chamber 20 is given a value greater than that of the volume which said gas would occupy at the end of the draining, i.e. when the pressure of the pressurant gas reaches its minimum value.

In weightlessness, the liquid contained in the storage tank can be found anywhere inside the envelope 10 whilst remaining in contact therewith. The liquid continuity between the internal wall of the enclosure and the chamber 20 is ensured by the channels. As and when the quantity of liquid contained in the storage tank reduces on the outside of the channels and of the tubular device, narrower and narrower capillary flows from between the channels and the internal wall of the enclosure, until they are reduced to the space between the porous walls 15c and the inside wall of the enclosure. Thereafter, the walls 15c are no longer wetted and lose their property of gas barriers. If there is still some liquid left against the internal wall of the enclosure, said liquid cannot be used and forms part of the "dead mass" of the storage tank. Any quantity of liquid which may be left can be minimized if a rather large number of channels is provided. However, an increased number of channels should not result in an increase of the tank mass proper which is greater than the saving expected on the dead mass of liquid. Moreover, the greater the volume of the channels and the more it becomes necessary to increase the dimensions of the chamber 20 for the reasons indicated in the preceding paragraph. The illustrated example gives the number of channels to be 8.

When the gas has penetrated inside the channels towards the end of the draining operation, said channels empty out during the phase or phases of utilization of liquid which follow.

The last part of the emptying of the storage tank consists in the phase or phases wherein the liquid contained in the volume 26 of the chamber 20 is expelled. The compartments 28, 29, with their porous walls 28a and 29a, behave like liquid collectors, establishing the liquid continuity between the opposite walls of the chamber 20 and the outlet passage 22. The draining is considered to be completed when the gas goes through the outlet gas barrier 28a–29a. The dead mass of liquid contained in the chamber 20 can be minimized by placing inside said chamber a collector device which can also reach the liquid in parts of the side wall of the chamber.

In the storage tank described hereinabove, the draining conduit 30 reaches into a channel 15. As a variant, the tube 30 can be closed at its end 30b inside the enclosure by a wall forming gas barrier. It is also possible to connect the end 30b of the draining conduit to the casing 16.

Of course, the invention is not limited to the description given hereinabove and on the contrary, various modifications or addition can be brought thereto without departing from the scope thereof.

What is claimed is:

1. A surface tension storage tank for liquid, comprising:
    an enclosure having a liquid outlet provided in a wall of the enclosure and through which liquid contained therein can be expelled under the action of a pressurant gas;
    a liquid collecting device extending in the enclosure;
    a tubular device situated inside the enclosure proximate the outlet and provided with a first part having a first cross-section and defining a chamber having a chamber volume communicating with the outlet and the collecting device, and provided with a second part, having a second cross-section smaller than the first cross-section, defining a draining conduit issuing at a first end into an area of the chamber opposite the outlet and which has a second end issuing in the internal volume of the tank and situated at a level of the tank more remote from the outlet than its first end; and
    walls forming gas barriers to separate the collecting device from the chamber at their point of communication and to separate the second end of the conduit from the internal volume of the tank.

2. Storage tank as claimed in claim 1, in which the collecting device is composed of a plurality of channels which extend along the internal surface of the enclosure and at a relatively small distance therefrom, and of which at least the wall facing the said internal surface is porous, and wherein the volume of the chamber of the tubular device is at least equal to the volume occupied after draining by a quantity of gas whose volume would have been equal to that of the channels before the draining started.

3. Storage tank as claimed in claim 2, wherein the draining conduit of the tubular device is connected by its second end to one of the channels.

4. Storage tank as claimed in claim 3, wherein a gas barrier is placed at the junction between the said draining conduit and the channel to which it is connected.

5. Storage tank as claimed in claim 1, wherein said chamber is cylindrical and has the same axis as the liquid outlet.

6. Storage tank as claimed in claim 1, wherein said chamber of the tubular device includes therein a liquid-collector device which communicates, on the one hand, directly with the liquid-outlet and, on the other hand, with the volume of the chamber through an outlet gas barrier.

7. Storage tank as claimed in claim 6, wherein the said chamber is cylindrical and contains an axial tube aligned with the liquid outlet and opening at its ends into two confronting compartments situated close to the end walls of the chamber and having at least partly porous confronting walls.

* * * * *